(12) United States Patent
Son

(10) Patent No.: US 7,159,267 B2
(45) Date of Patent: Jan. 9, 2007

(54) CAP FOR WIPER CONNECTOR

(75) Inventor: Il ho Son, Daegu (KR)

(73) Assignee: Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 11/182,751

(22) Filed: Jul. 18, 2005

(65) Prior Publication Data

US 2006/0230571 A1    Oct. 19, 2006

(30) Foreign Application Priority Data

Apr. 18, 2005    (KR)    .................. 10-2005-0031952

(51) Int. Cl.
*B60S 1/40*    (2006.01)
*B60S 1/38*    (2006.01)

(52) U.S. Cl. ............................ 15/250.201; 15/250.32; 15/250.43; 15/250.361

(58) Field of Classification Search ............. 15/250.32, 15/250.43, 250.44, 250.201, 250.361
See application file for complete search history.

(56) References Cited

U.S. PATENT DOCUMENTS

| | | | | |
|---|---|---|---|---|
| 4,118,825 A | * | 10/1978 | Hoebrechts et al. | ..... 15/250.32 |
| 4,342,126 A | * | 8/1982 | Neefeldt | .................. 15/246 |
| 5,070,573 A | * | 12/1991 | Journee et al. | .......... 15/250.32 |
| 2004/0010882 A1 | * | 1/2004 | Breesch | ................. 15/250.201 |
| 2004/0244137 A1 | * | 12/2004 | Poton | ...................... 15/250.32 |
| 2005/0166349 A1 | * | 8/2005 | Nakano et al. | ........ 15/250.201 |

FOREIGN PATENT DOCUMENTS

| | | | |
|---|---|---|---|
| DE | 3618326 | * | 12/1987 |
| DE | 40 32 427 | | 4/1991 |
| DE | 100 57 253 | | 5/2002 |
| EP | 0694459 | * | 1/1996 |
| FR | 2600292 | * | 12/1987 |

* cited by examiner

*Primary Examiner*—Gary K. Graham
(74) *Attorney, Agent, or Firm*—Roylance, Abrams, Berdo & Goodman, L.L.P.

(57) ABSTRACT

The present invention relates to a cap for a wiper connector of a motor vehicle. A cap for wiper is comprised of a pair of side walls facing each other to form space where at least a portion of the wiper connector is accommodated, a connecting part for connecting the pair of side walls, a mounting part which is releasably mounted to the wiper connector and a flab protruding outwardly from at least one of the the side walls.

2 Claims, 10 Drawing Sheets

CAP FOR WIPER CONNECTOR

This patent application claims priority from Korean Patent Application No. 10-2005-0031952 filed on Apr. 18, 2005, the contents of which are incorporated herein by reference.

FIELD OF THE INVENTION

The present invention relates to a cap for a wiper connector of a motor vehicle. More particularly, but not exclusively the present invention relates to a cap for a wiper connector provided to accommodate wiper connector of a flat type wiper blade assembly.

BACKGROUND OF INVENTION

A wiper blade assembly is provided in a windshield of a vehicle to wipe out drops of the rain on the windshield so that driver can secure his/her view. The wiper blade assembly is driven by a wiper arm which is operated by an operating motor. A wiper connector is provided in order to connect the wiper arm with the wiper blade assembly. Generally, the wiper blade assembly is provided with a guide clip to which a wiper connector is fastened. The wiper arm is connected to the wiper connector after the connector is fastened to the guide clip.

The windshield of a vehicle is disposed in a vehicle such that it directly receives an air resistance when the vehicle travels. Thus, when the vehicle travels at a high speed, the wiper blade can rise from the windshield. The rising of the wiper blade hinders the wiping operation. To prevent this situation spoiler is installed to the wiper blade assembly. However, a conventional spoiler is connected to the wiper assembly by a screw in general.

The wiper blade assembly is classified into a yoke-type wiper arm and a flat-type wiper arm according to structure of the wiper blade. The yoke-type wiper arm is configured such that a plurality of the yokes which is curved like a bow are fastened one another. The yoke-type wiper arm is widely used at present. The flat-type wiper blade is constructed with one elastic support member instead of a plurality of the yokes. Thus, the structure of the wiper blade is simple and the appearance of the wiper blade assembly is aesthetic. In these reasons, the distribution of the flat-type wiper blade increases recently. Meanwhile, aforementioned spoiler is generally disposed on elastic support member of the conventional flat type wiper blade.

FIG. 1 shows a perspective view of the flat-type wiper blade assembly. The wiper blade assembly 20 shown in FIG. 1 is so called a flat-type wiper blade. Its detailed description is described in Korean Patent No. 0454874. The patent is incorporated herein by a reference.

As shown in FIG. 1, the wiper blade assembly 20 comprises a blade rubber 23 which contacts with a windshield of a vehicle; a pair of spoilers 21 disposed on the elastic support member 25; and a wiper connector 300 disposed on the longitudinally center of the elastic support member 25. The wiper connector 300 comprises a connecting member 40 where a wiper arm (not shown) is connected, and a guide clip 30 where the connecting member 40 is fastened and accommodates the connecting member 40. As shown in FIG. 1, it is preferred that the guide clip 30 and the connecting member 40 are formed separately and thereafter they are assembled. However, the guide clip 30 and the connecting member 40 may be integrally formed. As shown in FIG. 1, the spoiler 21 that is provided at a wiper blade assembly 20 cannot be disposed on the location where the wiper connector 300 is provided. Thus, the appearance is not so aesthetic because of the discontinuity of the spoiler caused by provision of the wiper connector 300. Further, wiping performance is lowered and noise is also generated because the wiper blade assembly rises from a windshield due to not providing spoiler in the location where the connector is provided.

SUMMARY OF THE INVENTION

The object of the present invention is to provide a cap accommodating the portion where a wiper connector is provided and having a spoiler thereof such that the appearance of the wiper connector becomes aesthetic and such that rising of the wiper is not occurred when a vehicle travels at a high speed.

The wiper connector cap of the present invention comprises a couple of side walls facing each other to form a volume where at least a part of the wiper connector can be accommodated; a connecting part connecting one side wall to the other side wall; and an engaging part provided to be releasably connected to the wiper connector; and a flap protruding outwardly from at least one of the said side walls.

It can be understood that the connector can be constructed of two or more members, for example, a combination of a guide clip and a connecting member. The flap is formed integrally with the side walls. Preferably, the flap is provided in the side wall that is outwardly facing with respect to the windshield in order to reduce air resistance applied to the wiper connector cap while vehicle's traveling and in order to prevent wiper from rising from the windshield. On the other hand, the wiper connector may comprise a guide clip and a wiper connecting member that is pivotably fastening to the guide clip. Alternatively, the connector may be constructed by a single member.

According to this constitution, the appearance of the wiper becomes aesthetic by virtue of the wiper connector cap accommodating the wiper connector. Further, the flap provided in at least one of the side walls of the wiper connector cap prevents the wiper blade assembly from rising while a vehicle travels at a high speed.

Preferably, the connecting part comprises a first transverse portion and a second transverse portion that is apart from the first connecting portion at a predetermined distance.

A wiper arm that is driven by driving shaft is connected with the wiper connector accommodated between the side walls. In the event that the wiper arm is U-hook type arm, the hook is disposed ahead of the connector at a predetermined distance and then the hook is pulled toward the connector, thereby making the hook fastened with the connector. Thus, it is preferred that the first and second transverse portions are apart each other at a sufficient distance in order not to interfere the move of the U-hook type wiper arm.

More preferably, the wiper connector cap further comprises a support that is axially supported in at least one of the first and second transverse portions, and a cover having upper surface extending by less distance than the predetermined distance between the first and second transverse portions.

As described above, the transverse portions are apart with each other in order not to interfere in the move of the U-hook type wiper arm. In this structure, once the wiper arm is connected with the wiper connector, the space between the transverse portions does not look so aesthetic. Thus, the wiper cap is provided with a cover for closing the space between the transverse portions of the side walls. The cover is pivotabley fastened to the transverse portion in order that a wiper arm is disposed in the space between the transverse portions in the event that the wiper arm is U-hook type wiper arm.

More preferably, the side wall comprises a flange protruding from inner surface of the side wall, and the cover comprises an engaging portion that is releasably engaged with the flange. It is because it is preferable that the cover is not movable with respect to the side wall after the cover closes the space between the transverse portions.

It is preferred that the wiper blade assembly is a flat-type wiper blade.

DETAILED DESCRIPTION OF THE INVENTION

Hereinafter, the present invention will be described in detail with reference to accompanying drawings. The invention will now be described based on the preferred embodiments, which do not intend to limit the scope of the present invention, but exemplify the invention. All of the features and the combinations thereof described in the embodiments are not necessarily essential to the invention.

Figure 2:
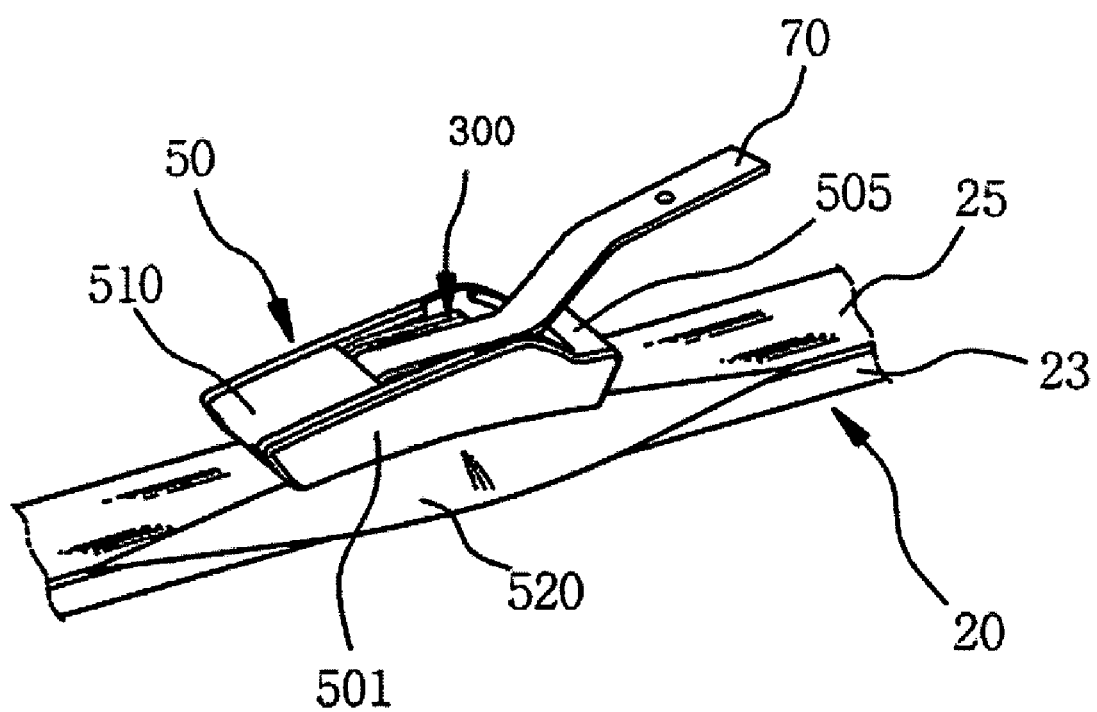
FIG. 2 shows a partial perspective view of a wiper to which a cap for wiper connector according to the present invention is connected.

FIG. 2 shows a perspective view of a wiper to which a cap for wiper connector according to the present invention is connected. The wiper connector and the cap for wiper connector will be described hereinafter with reference to FIG. 2.

As shown in FIG. 2, the cap 50 for wiper connector is releasably fastened to a wiper connector 300 that is provided at about longitudinally center of elastic support member 25 supporting flexible strip which is directly contacting with a windshield. A wiper arm 70 is connected to the connecting member 40 of the wiper connector 300.

The wiper connector cap 50 comprises a pair of side walls 501 that are apart with each other to form space accommodating the wiper connector 300, transverse portions 503, 505 for connecting the pair of side walls, a flap 520 that is integrally formed with at least one of the side walls, and cover 510.

Figure 3:
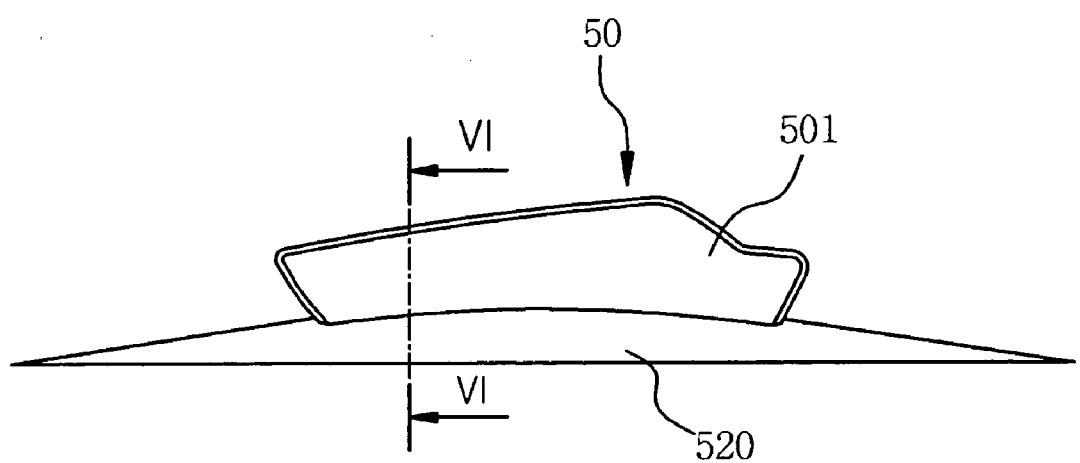
FIG. 3 shows a front view of a cap for wiper connector according to the present invention.

FIG. 3 shows a front view of the wiper connector cap according to the present invention.

It is preferred that flap 520 is integrally formed with side wall 501 as shown in FIG. 2. The flap 520 may be formed as being separate with the side wall. The flap 520 can act as a role of spoiler for further preventing rise of the wiper when a vehicle travels at a high speed. Preferably, the flap has a streamline shape as shown in FIG. 3.

Figure 4:
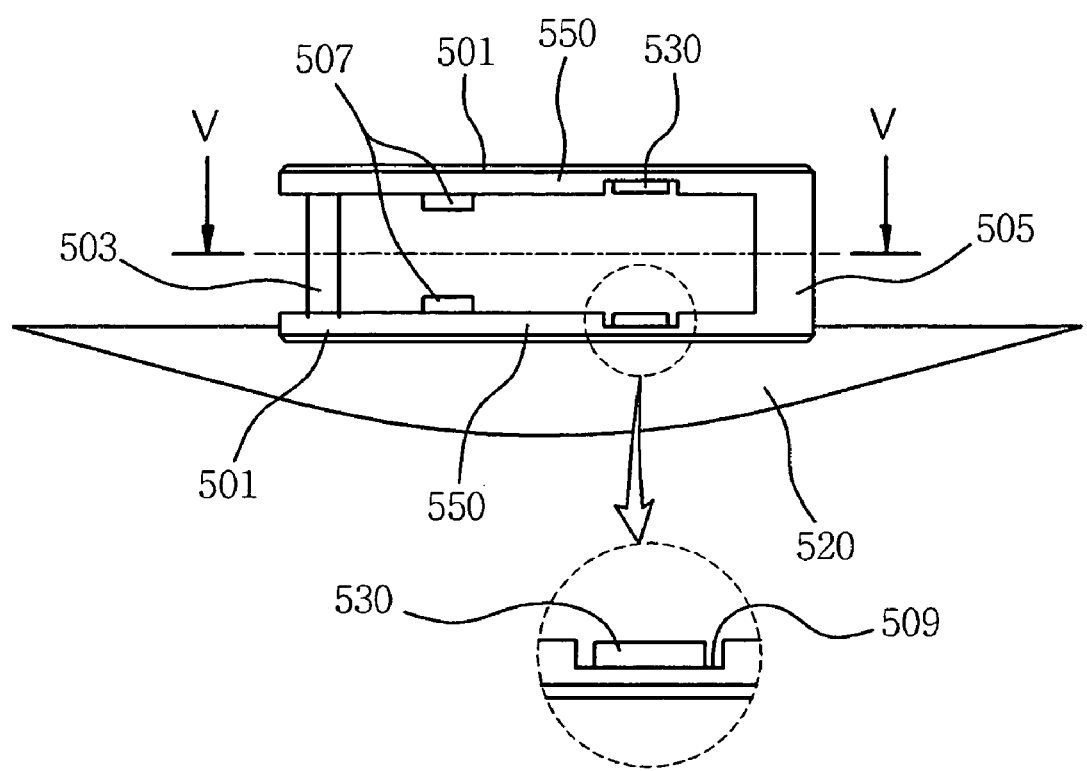
FIG. 4 shows a bottom view of a cap for wiper connector according to the present invention.

FIG. 4 shows a bottom view of a wiper connector cap 50 according to the present invention.

As shown in FIG. 4, the wiper connector cap 50 is comprised of a pair of side walls 501 that define space for accommodating a wiper connector therebetween, and a first transverse portion 503 and a second transverse portion 505 that extend between the side walls. The flap 520 is integrally formed with at least one of the pair of side walls 501. The side wall 501 is provided with a flange 550 to which a cover 510 is releasably fastened, and a stopper 507 for preventing the cover 510 from pivoting toward the space between the side walls 501. Further, provided is a wiper connector mounting portion 530 which is releasably mounted to the wiper connector 300.

Further, it is preferred that gripping groove 509 is provided in order to make it easy to fasten a wiper arm 70 to a wiper connector 300 or to release the wiper arm 70 from the wiper connector 300. It is easily understood that the flap 520 may be provided in both of side walls 501 if necessary even though FIG. 4 shows a structure wherein the flap 520 is provided in one of side walls 501.

Figure 5:
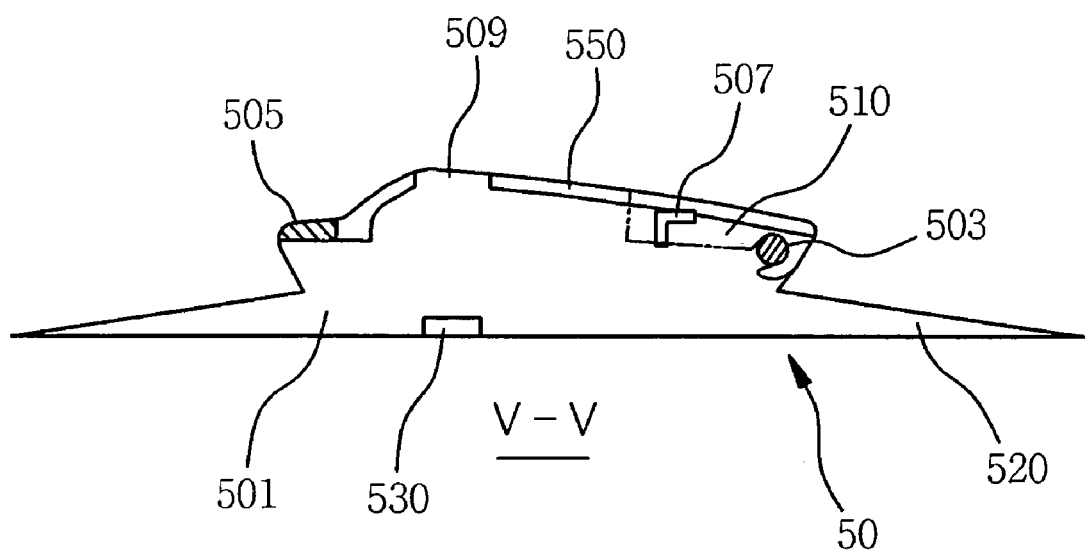
FIG. 5 shows a cross-sectional view of a cap for wiper connector according to the present invention, in which its section taken along line A–A' of FIG. 4 is depicted.

FIG. 5 shows a cross-sectional view of the wiper connector cap, which is seen from line A–A' of FIG. 4.

Figure 1:
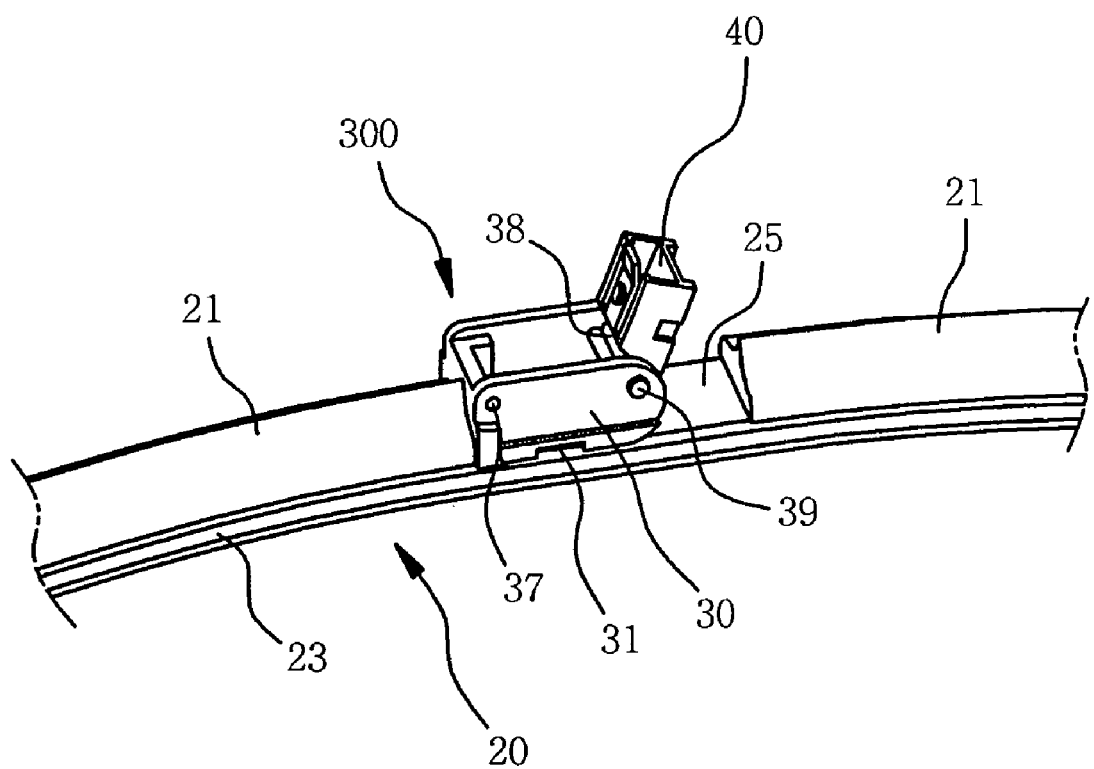
FIG. 1 shows a perspective view of a wiper connector of a conventional flat blade wiper assembly.

As shown in FIG. 5, a cover 510 is fastened to first transverse portion 503. The side wall 501 is provided with flange 550 to which the cover 510 is releasably fastened and is provided with a stopper 507 for preventing the cover 510 from pivoting after the cover 510 is fastened to the flange 550. Further, the side wall 501 of the wiper cap 50 is provided with a mounting portion 530 for releasably fastening to the wiper connector 300. The wiper connector 300 is provided with a mounting groove where the mounting portion is fastened. The mounting groove 31 is shown in wiper connector 300 of FIG. 1. It is preferred that the wiper cap 50 is made of a material such as plastic in order to have elasticity. The mounting portion 530 is releasably fastened to the mounting groove by use of elastic deformation.

Figure 6:
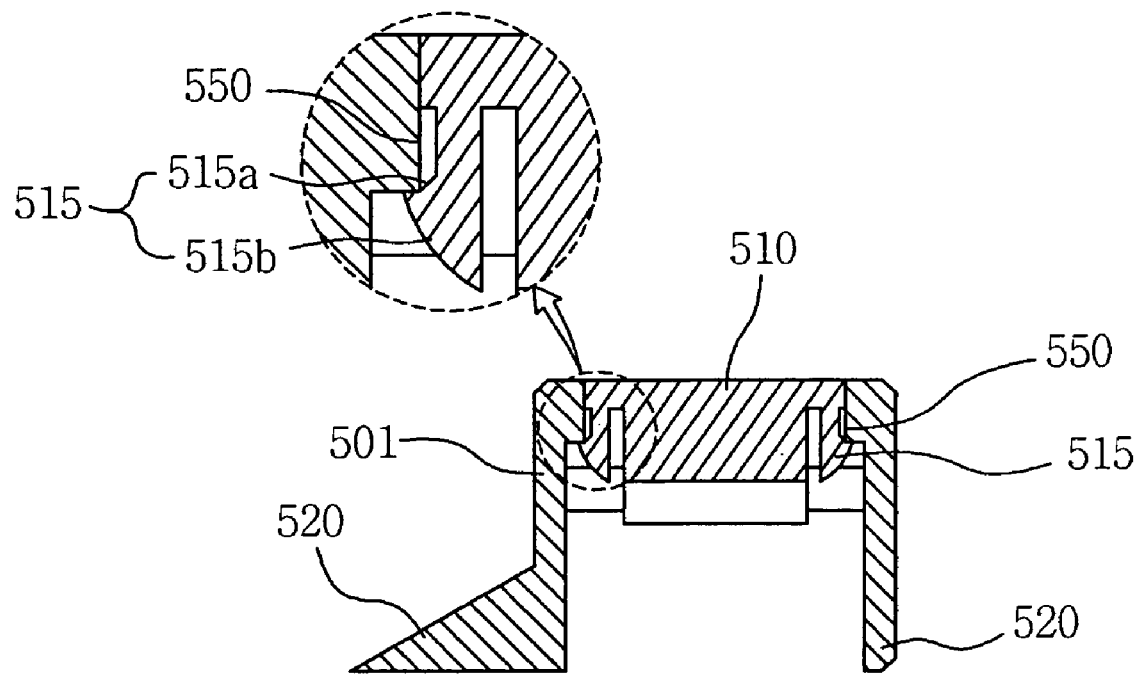
FIG. 6 shows a cross-sectional view of a cap for wiper connector according to the present invention, in which its section taken along line B–B' of FIG. 3 is depicted.

FIG. 6 shows a structure of the cover 510 and the flange 550 of the side wall 501 when they are fastened. Referring to FIG. 6, fastening between the side walls and the cover will be described in detail hereinafter.

FIG. 6 shows a cross-sectional view of the wiper cap, which is seen from line B–B' of FIG. 3.

As shown in FIG. 6, the cover 510 is provided with engaging portion 515 that is releasably engaged with the flange 550 of the side wall 501. The engaging portion 515 extends from the cover 510 to the space where the wiper connector is accommodated and has engaging protrusions at the ends thereof, which engages with the flange 550. The engaging portion is made of elastic material such that the protrusions are deformed to decrease the distance therebetween once a first inclined surface 515b of the engaging protrusion contacts with the flange 550. Thereafter, the engaging protrusions return to their original state such that the engaging portion 515 engages with the flange 550.

When it is intended to release the fastening state between the cover 510 and the flange 550, the cover 510 only has to be pulled upwardly. It is preferred that a second inclined surface 515a is provided at the upper portion of the engaging portion 515 in order to easily release the fastening state.

Figure 7A:
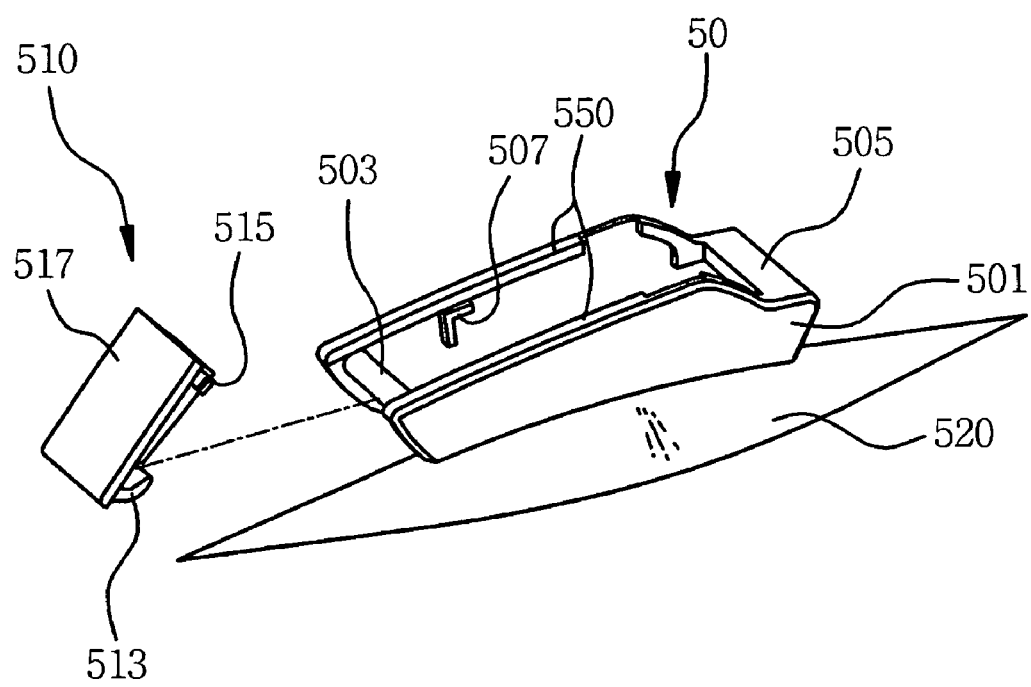
FIG. 7a, FIG. 7b and FIG. 7c show an exemplified process for connecting a cap for wiper connector according to the present invention to a wiper connector.

On the other hand, it is preferred to provide a stopper 507 at the side wall 501 as shown in FIG. 7a in order to prevent the cover 510 from pivoting toward the inner space between the side walls 501.

Figure 7B:
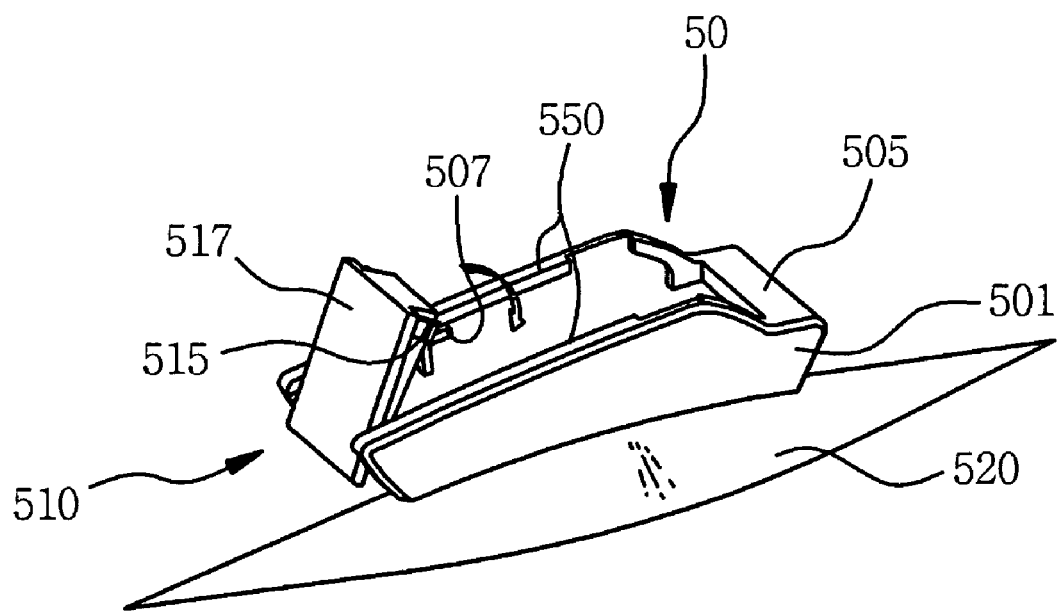
Figure 7C:
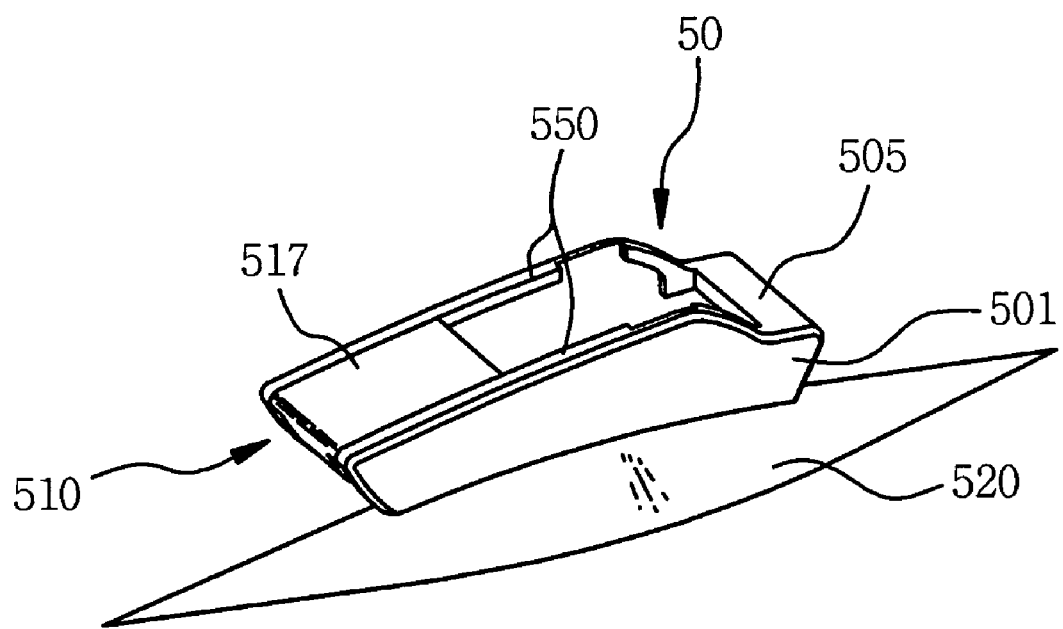

FIGS. 7a, 7b and 7c show a process by which the cover is fastened in accordance with the present invention. FIG. 7a shows the configuration before the cover is assembled to the body of the wiper cap 50. FIG. 7b shows the configuration before the cover 510 is fastened to the flange 550. FIG. 7c shows the configuration after the cover 510 is fastened to the body of the wiper. A wiper connector 300 and a wiper arm 70 are not shown for illustrative simplicity.

The wiper connector cap 50 accommodates the wiper connector 300 where a wiper arm 70 is connected as shown in FIG. 2. In the event that the wiper arm is a U-hook type arm, it is necessary to form space in front of the wiper connector 300 in order to make the hook dispose for fastening or releasing. Therefore, the transverse portions of the connector cap 50 should be configured such that the distance therebetween is longer than the length of the wiper connector 300. However, once the wiper arm 70 is fastened to the wiper connector 300, the space that is provided for easy fastening of the U-hook type wiper arm becomes unnecessary. This space may cause noise when a vehicle travels and does not have aesthetic appearance. The cover 510 is provided for solving this problem by covering the upper portion of the space after completing fastening of the wiper arm.

The connector cap 50 where the cover 510 is provided will be described in detail hereinafter.

As shown in FIG. 7a, the wiper cap 50 is provided with a first transverse portion 503 and a second transverse portion 505 extending between a pair of side walls 501. The cover 510 is pivotably fastened to the first transverse portion 503. The cover 510 comprises a support 513 that is pivotably supported at the first transverse portion 503 and an upper surface 517. An engaging portion 515 that extends downwardly from the upper surface 517 is configured so as to be releasably engaged with the flange 550 provided at the side wall 501 as described above. It is preferred that the inner diameter of the support 513 is configured as being less than the outer diameter of the first transverse diameter such that the support 513 is not easily separated from the first transverse portion 503 once it is fastened to the first transverse portion 503.

FIG. 7b shows a configuration that the support 513 of the cover 510 is fastened to the first transverse portion 503. The wiper connector 300 is accommodated inside the side walls although not being illustrated in FIGS. 7a and 7b. The configuration shown in FIG. 7b is that the cover 510 is turn over in order to fasten a U-hook type wiper arm to the wiper connector 300. It can be understood that the hook of the wiper arm is disposed in the space between the side walls opening since the cover 510 is turn over.

FIG. 7c shows a configuration that the cover 510 is fastened to the side walls 501 after the wiper arm 70 is connected to the wiper connector 300. The fastening configuration between the cover 510 and the side walls 501 can be understood with reference to FIG. 4.

Figure 8:
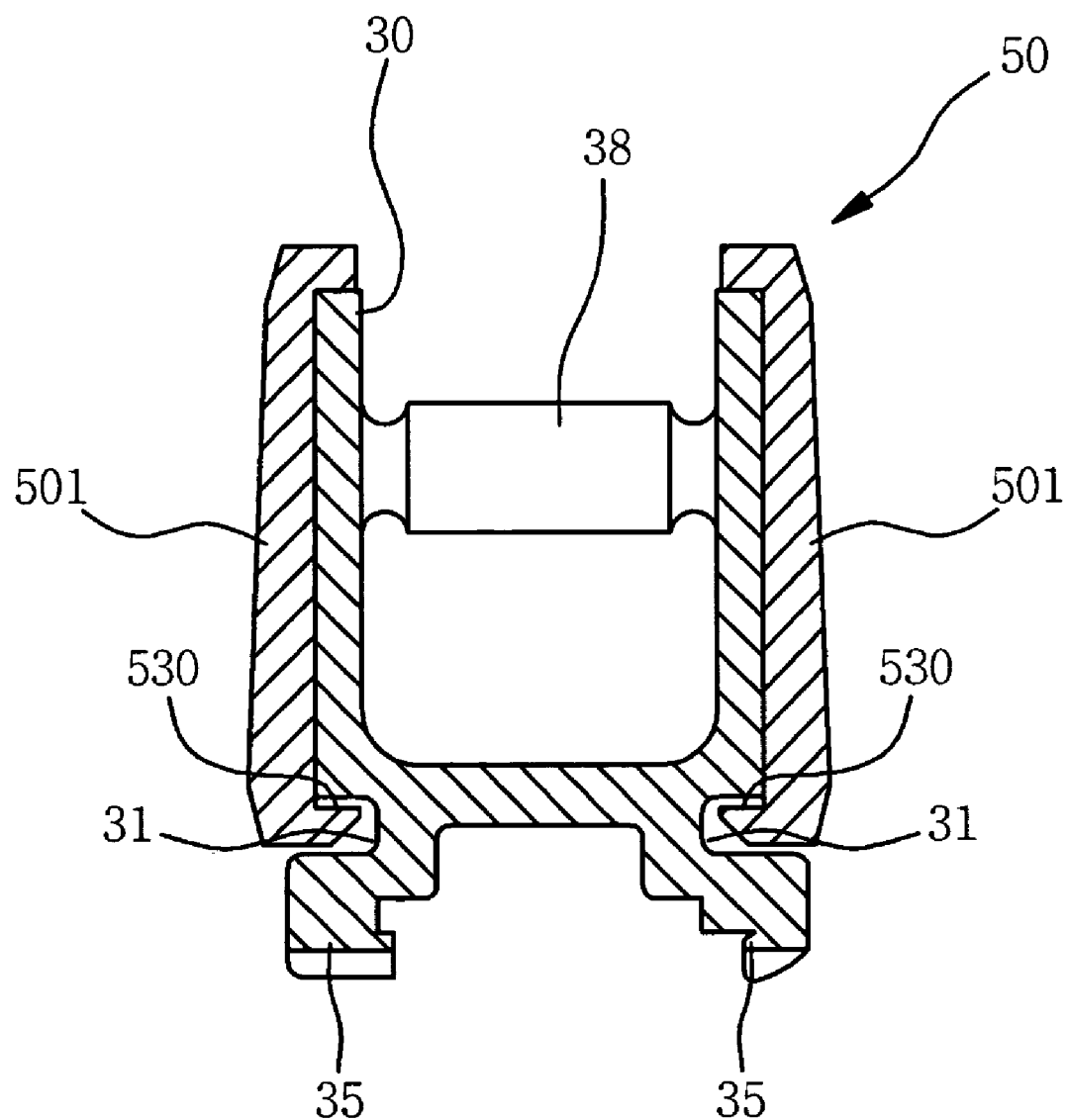
FIG. 8 shows a cross-sectional view of a connecting portion of wiper connector cap and a wiper connector.

FIG. 8 shows a cross-sectional view of the configuration that a wiper connector cap according to the present invention is fastened to a wiper connector. Referring to FIGS. 1 to 8, the fastening between the wiper connector cap and wiper connector will be described in detail.

FIG. 8 shows a configuration that the wiper connector cap 50 is fastened to guide clip 30 of the wiper connector 300. The guide clip 30 is provided with a shaft 38 to which a connecting member 40 is fastened. Fastening groove 31 to which mounting portion 530 of the wiper connector cap is fastened is formed at walls that face each other so as to define space for accommodating the connecting member 40. It is preferred that lower portion 35 of the guide clip 30 is fixed at a wiper blade 20 and that fixing is conducted by riveting.

Although the present invention has been described by way of exemplary embodiments, it should be understood that those skilled in the art might make many changes and substitutions without departing from the spirit and the scope of the present invention which is defined only by the appended claims.

The invention claimed is:

1. A cap accommodating a wiper connector to which a wiper arm is connected said cap comprising:
    a pair of side walls facing each other to form a space where at least a portion of said wiper connector is accommodated;
    a connecting part for connecting said pair of side walls the connecting part including a first transverse portion and a second transverse portion, said second transverse portion being apart from said first transverse portion by a predetermined distance; and
    a mounting part being releasably mounted to said wiper connector;
    a flap protruding outwardly from at least one of said side walls; and
    a cover, said cover having a support and an upper surface, said support being pivotably supported at at least one of said transverse portions, said upper surface having a length which is shorter than the distance between said first transverse portion and said second transverse portion.

2. The cap accommodating the wiper connector to which the wiper arm is connected of claim 1, wherein each said side wall comprises a flange protruding from an inner surface of the thereof, and said cover comprises an engaging portion which is releasably engaged with said flange.

* * * * *

UNITED STATES PATENT AND TRADEMARK OFFICE
CERTIFICATE OF CORRECTION

PATENT NO. : 7,159,267 B2
APPLICATION NO. : 11/182751
DATED : January 9, 2007
INVENTOR(S) : Il ho Son Page 1 of 1

It is certified that error appears in the above-identified patent and that said Letters Patent is hereby corrected as shown below:

Title Page, Item (73) assignee name should be changed to:

KCW Corporation

Signed and Sealed this

Twenty-third Day of October, 2007

JON W. DUDAS
*Director of the United States Patent and Trademark Office*